Sept. 8, 1942.  F. L. CREAGER  2,295,387
INDICATOR
Filed July 31, 1940  2 Sheets-Sheet 1

Inventor
Frederick L. Creager
By
Attorney

Sept. 8, 1942.  F. L. CREAGER  2,295,387
INDICATOR
Filed July 31, 1940  2 Sheets-Sheet 2
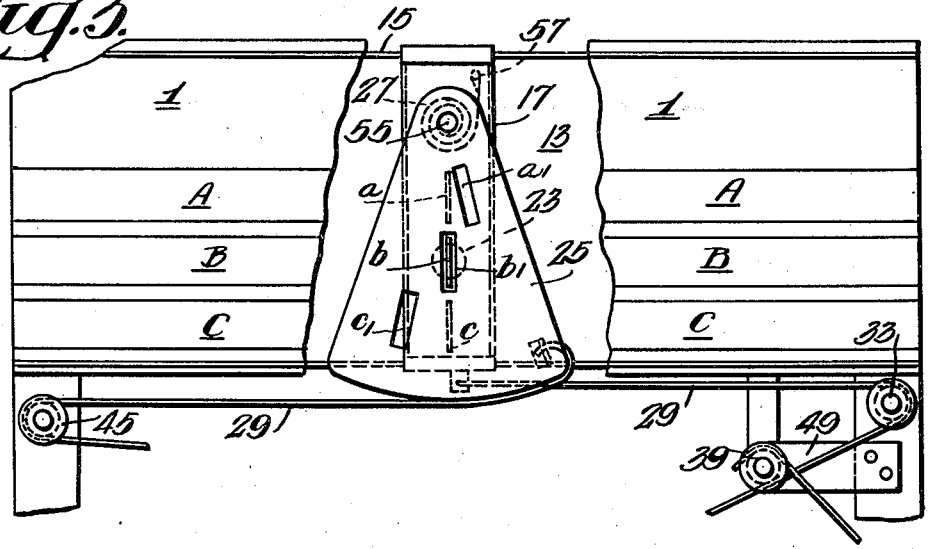
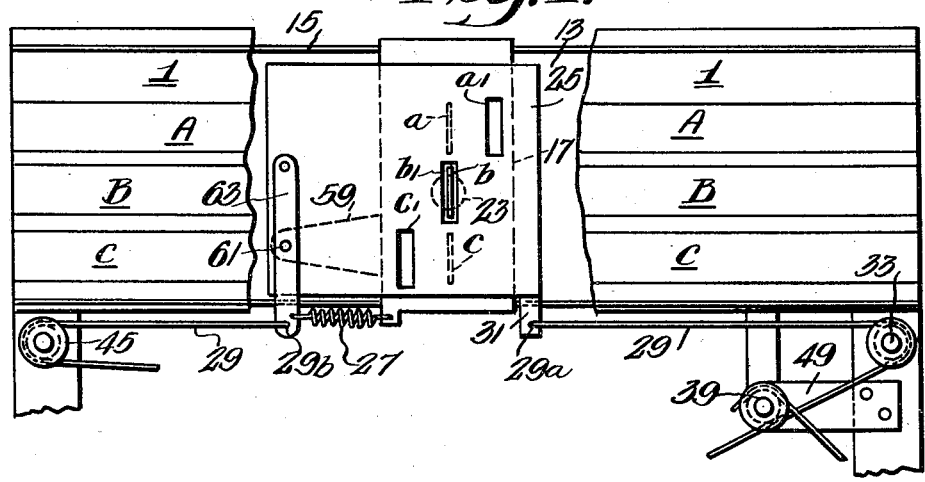
Inventor
Frederick L. Creager
By
Attorney Patented Sept. 8, 1942

2,295,387

UNITED STATES PATENT OFFICE 2,295,387

INDICATOR

Frederick L. Creager, Camden, N. J., assignor to Radio Corporation of America, a corporation of Delaware Application July 31, 1940, Serial No. 349,027

4 Claims. (Cl. 116—124.1)

This invention relates to indicators and particularly to multi-scale tuning indicators for radio receivers.

In radio receivers capable of translating signals in more than one frequency band and employing separate scales individual to each of said bands it is desirable to provide a positive indication of the particular band in use. To this end it has previously been proposed to provide several band scales on a translucent dial surface and to selectively illuminate only that portion of the dial containing the scale individual to the particular band in use, either by means of a mask or shutter designed to cover all of that part of the translucent surface which is not in use or by means of lamps and reflectors individual to the several scales.

Dials employing separate lamps and reflectors for each of the several scales are objectionable because of the relatively larger number of parts employed; further, the switching system necessary for the selective operation of these parts may be quite complicated. On the other hand, indicators employing dials having shutters adapted to mask all of that part of the dial which is not in use are cumbersome in that they require extra cabinet space and an excessive actuating force. Of perhaps more importance, is the fact that a large shutter decreases the total quantity of light available adjacent the dial, so that its reading may be rendered difficult.

Accordingly, the principal object of the present invention is to obviate the above described and other less apparent objections to multi-scale indicators of the prior art.

Another object of the invention is to provide a full-vision multi-scale indicator, including a movable pointer, and wherein the pointer per se provides a positive indication of the particular band-scale in use.

The present invention contemplates and its practice provides a multi-scale indicator wherein the dial in its entirety may remain illuminated during operation of the set; and wherein an indication of the particular band scale in use is afforded by a pointer which apparently moves from one scale to another as the band change switch is actuated, and thence along the selected scale as the set is tuned to the desired station or frequency.

Figure 1:
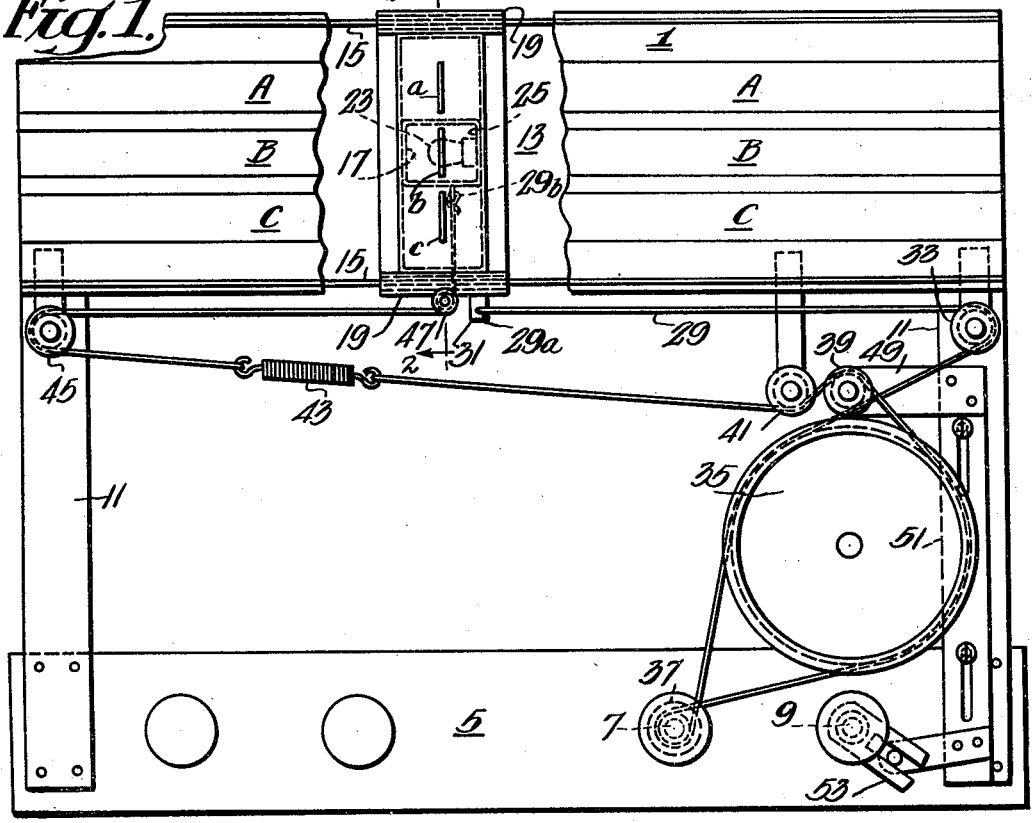
Figure 2:
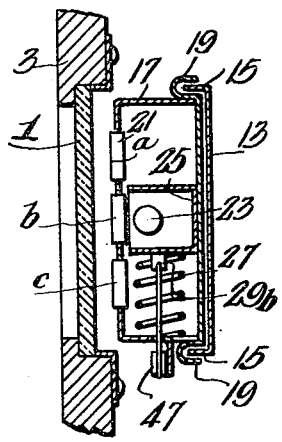

Certain details of construction together with other objects and advantages will be apparent and the invention itself will be best understood by reference to the following specification and to the accompanying drawings, in which:

Figure 1 is a front elevational view of a multiscale indicator embodying the invention, the dial being partly broken away to reveal a combined frequency and band indicating pointer, Figure 2 is a sectional view taken on the line 2—2 of Fig. 1, and Figures 3 and 4 are front elevational views showing other forms of pointer mechanisms embodying the invention.

Like reference characters designate the same or corresponding parts in all figures.

In Figs. 1 and 2, I designates a more or less conventional translucent dial (which may be edge-lighted, if desired) having three band scales A, B and C marked thereon and which may be supported on the front panel 3 of a cabinet, as shown in Fig. 2. The cabinet contains the base or chassis 5 of a radio receiver which may be provided with the usual controls including a tuning control shaft 7 and a second shaft 9 which will be understood to be connected to a suitable band change switch or other mechanism, not shown. These shafts extend to the front of the control panel 3 and may be provided with knobs or other actuating means.

Rigidly mounted behind the translucent dial I as on arms II which are secured at their lower ends to the chassis 5 is a back plate 13 which is preferably provided with a pair of inwardly bent longitudinal edges 15 which extend the full length of the dial and comprise a track or guideway for a movable housing 17 containing a pointer mechanism of special construction. This housing 17 may be of box-like construction and in any event is preferably provided at its rear with a suitable carriage, such, for example, as the flanges 19, upon which it travels across the dial I upon the tracks 15. The front surface of the housing is provided with a slit 21 through which light from a lamp 23, within the housing, is transmitted in the form of a pointer which is visible from the front of the translucent scale bearing surface I. This slit 21 may be divided into a number of segments a, b, c, each being individual to, and in permanent register with, the separate band scales A, B, and C, respectively.

As shown more clearly in Fig. 2, the slots a, b and c may each contain a strip of celluloid or the like of a color different from that of the others and individual to the particular band scale with which it is in register. The lamp 23 is contained in an open faced receptacle or reflector 25 which is mounted for movement within and with respect to the housing 17. The dimensions of the open (front) side of the reflector 25 are such as to span but a single scale, hence the top and bottom surfaces of the receptacle comprise an effective mask for that portion or portions of the pointer which lie adjacent the scales which are not in use.

The lamp 23 is normally biased upwardly, that is, to a position adjacent the "top" scale A by means of spring 27 which exerts its force between the bottom surfaces of the housing 17 and reflector 25. In Figs. 1 and 2 the lamp 23 and reflector 25 are shown as having been moved (in a manner later described) against the force of its bias to a position whereat it is in register with the central scale B.

Since light from the lamp 23 can be reflected outwardly only through the sections (a, b or c) of the slot with which it is in register, the distinctively colored pencil or pointer of light which is visible to an observer at the front of the dial will appear adjacent but one band scale at any given moment; that is, the particular band scale in use at that moment.

As shown in Fig. 1, a cord drive is preferably provided for moving the "pointer means" (17, 19, 21, 23, 25, 27) on its tracks 15 across the dial 1. This drive mechanism comprises a cord 29, one end (29a) of which is tied to an inflexible arm 31 on the housing 17 and the other end (29b) of which extends into the housing and preferably is tied to the movable reflector 25 within which the lamp 23 is contained. The path of the cord from the end 29a to its other end 29b is defined by the pulleys 33, 35, 37, 39, 41, the takeup spring 43 and the pulleys 45 and 47. The last mentioned pulley 47 is affixed to and moves with the housing 17. The pulleys 33, 41 and 45 are permanently fixed with respect to the chassis 5 and dial 1 as are the pulleys 37 and 35 on the tuning control and main tuning shafts. The pulley 39, on the other hand, is mounted on a movable arm 49 which is adapted to be moved by a lever mechanism 51, 53, which is connected to the band change switch shaft 9.

Now, assuming for the moment that the movable idler pulley 39 is in some selected position, it will be apparent that, when the tuning control shaft 7 is rotated, the cord 29 and hence the pointer housing 17 will be moved across the scale-bearing surface 1 without in any wise affecting the position of the lamp 23 within the housing. On the other hand, if the pulley 39 is raised (by movement of the lever mechanism 51, 53, which is operated by the band change switch 9), the force exerted on only one end, i. e., end 29b, of the cord will be disproportionately increased and the reflector or mask 25 will be moved against the force of its biasing spring 27 downwardly to a position whereat it is in register with one of the lower segments b or c of the pointer sections a, b, c, as determined by the distance which the pulley 39 has been moved. When the idler pulley 39 is lowered by operation of the band switch 9, the resulting slack in the cord intermediate its end 29b and the pulley 39 permits and the lamp and mask 23, 25 to be moved upwardly by the force of the biasing spring 27 into register with another band scale.

In each of the separate embodiments of the invention shown in Figures 3 and 4, the lamp 23 is maintained in a fixed position within its housing 17 and only the mask 25 is moved with respect to the pointer segments a, b and c. Thus, as shown in Fig. 3, the mask may be in the form of triangular plate 25 which is pivoted at 55 adjacent its apex to the lamp housing 17. This mask 25 is provided with slits a', b', and c', which are offset vertically and laterally one from another so that they are selectively brought into register with the aligned pointer segments or slits a, b and c in the housing when the mask is moved on its pivot in response to a one-sided increase or decrease in the force applied to the mask by the cord 29 when the position of the idler pulley 39 is changed by the lever mechanism (shown in part at 49) which will be understood to be linked to the wave change switch (not here shown). A helical spring 27 which may be positioned adjacent the pivot 55 and which is anchored to the housing 17, as at 57, serves to move the mask 25 in the return direction when the tension produced by a change in the position of the pulley 39 is relaxed.

Referring to Fig. 4, the mask 25 in this embodiment of the invention is adapted to be moved in the direction of extension of the dial scales A, B and C. To this end, the lamp housing 17 may be provided with a laterally-extending arm 59 which serves as a fulcrum 61 for a bell crank 63. One end of this pivoted member 63 is fixed to the mask 25 and one end (29b) of the cord 29 is tied to its other end. As in the other embodiments of the invention, the other end (29a) of the cord 29 is tied to an immovable arm 31 on the lamp housing. When the tension on that end (29b) of the cord which is tied to the bell crank 63 is increased by changing the position of the idler pulley 39, the bell crank 63 moves the mask 25 to the right and, when this tension is relaxed by returning the pulley to its former position, the mask is moved to the left as by the spring 27. The degree of movement in each case is, of course, calculated to bring one of the slits a', b' and c' in the mask 25 in register with the corresponding pointer segment a or b, or c.

Other embodiments of the invention will suggest themselves to those skilled in the art. Accordingly, the foregoing should be interpreted as illustrative and not in a limiting sense except as required by the prior art and by the spirit of the appended claims.

What is claimed is:

1. A multi-scale indicator comprising, in combination, a dial surface having a plurality of scales thereon, an illuminable pointer and a lamp therefor mounted for movement across said scales, and means for moving said lamp with respect to said pointer to illuminate that portion of said pointer which lies adjacent a selected scale.

2. A multi-scale indicator comprising, in combination, a translucent surface having a plurality of scales thereon, a pointer comprising a lamp and a reflector therefor mounted behind said translucent surface for movement across said scales and from one scale to another, said reflector being adapted to confine the light from said lamp to a single scale, means for moving said lamp and reflector across said translucent scale bearing surface, and means for moving said lamp and reflector into indicating relation with respect to a selected one of said scales.

3. A multi-scale indicator comprising, in combination, a dial surface having a plurality of scales thereon, a lamp mounted for movement across said scales and from one scale to another, means for moving said lamp to a position adjacent a selected scale, and means for moving said lamp across the scale selected.

4. A multi-scale indicator comprising, in combination, a dial surface having a plurality of scales thereon, a pointer comprising a lamp mounted for movement across said scales and from one scale to another, means for mechanically biasing said lamp to a position adjacent a given one of said scales, and means for moving said lamp against the force of its bias to a position adjacent another of said scales.

FREDERICK L. CREAGER.